(12) United States Patent
Chetlur et al.

(10) Patent No.: US 9,361,397 B2
(45) Date of Patent: Jun. 7, 2016

(54) DEVICE DATA PERSONALIZATION

(71) Applicant: International Business Machines Corporation, Armonk, NY (US)

(72) Inventors: Malolan Chetlur, Bangalore (IN); Aakar Gupta, Indirapuram (IN); Bikram Sengupta, Bangalore (IN); Ashay U. Tamhane, Ahmednagar (IN)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 14/079,792

(22) Filed: Nov. 14, 2013

(65) Prior Publication Data
US 2015/0134640 A1 May 14, 2015

(51) Int. Cl.
*G06F 17/30* (2006.01)

(52) U.S. Cl.
CPC ............................... *G06F 17/30905* (2013.01)

(58) Field of Classification Search
CPC ............ G06F 17/30867; G06F 17/30864; G06F 17/30554; G06F 17/30828; G06F 17/30905
See application file for complete search history.

(56) References Cited

U.S. PATENT DOCUMENTS

| 6,505,242 | B2 | 1/2003 | Holland et al. |
| 7,797,722 | B2 | 9/2010 | Lin et al. |
| 7,957,691 | B1 | 6/2011 | Lee |
| 8,036,690 | B1 | 10/2011 | Delker et al. |
| 8,321,527 | B2 | 11/2012 | Martin et al. |
| 8,370,341 | B1 | 2/2013 | Cromwell et al. |
| 8,392,594 | B2 | 3/2013 | Georgis et al. |
| 2004/0181604 | A1 | 9/2004 | Immonem |
| 2006/0064637 | A1* | 3/2006 | Rechterman ...... G06F 17/30905 715/205 |
| 2006/0224943 | A1* | 10/2006 | Snyder .............. G06F 17/30017 715/209 |
| 2007/0028266 | A1* | 2/2007 | Trajkovic ............... G06Q 30/02 725/46 |
| 2007/0236505 | A1* | 10/2007 | Jung ..................... G06T 3/4023 345/589 |
| 2010/0325111 | A1* | 12/2010 | Aravamudan ..... G06F 17/30035 707/737 |
| 2011/0305375 | A1* | 12/2011 | Nelson .................... G06F 3/005 382/118 |

FOREIGN PATENT DOCUMENTS

WO 2011140036 11/2011

OTHER PUBLICATIONS

Anonymous; Method and Systems to Synchronize Internet Content on Mobile Device; IP.com No. IPCOM000208549D; Jul. 12, 2011; 6 pages.
Lops et al.; Content-Based Recommender Systems: State of the Art and Trends; Chapter 3 of Recommender Systems Handbook; Springer US Publisher; Copyright 2011; pp. 73-105.

* cited by examiner

*Primary Examiner* — Dinku Gebresenbet
(74) *Attorney, Agent, or Firm* — Schmeiser, Olsen & Watts; John Pivnichny

(57) ABSTRACT

A method and system for synchronizing contents is provided. The method includes retrieving a user profile associated with a user. A user specified order for presenting data from a services content repository is determined. A context of the data is determined and the user profile is compared to additional user profiles. In response, commonly followed orders of presenting the data to a plurality of users are determined. Specified data and a specified order for presenting the specified data to the user via a personal device are determined.

14 Claims, 4 Drawing Sheets

DEVICE DATA PERSONALIZATION

FIELD

The present invention relates generally to a method for personalizing data for a device, and in particular to a method and associated system for adapting data presentation on a user basis.

BACKGROUND

Determining content presentation typically includes an inaccurate process with little flexibility. Accordingly, there exists a need in the art to overcome at least some of the deficiencies and limitations described herein above.

SUMMARY

A first aspect of the invention provides a method comprising: retrieving, by a computer processor of a computing system, a first user profile associated with a first user; determining, by the computer processor, a user specified order for presenting data from a services content repository; determining, by the computer processor in response to input from a content administrator, a context of the data; comparing, by the computer processor, the first user profile to profiles of a plurality of users associated with the first user; determining, by the computer processor based on results of the comparing, commonly followed orders of presenting the data to the plurality of users; and determining, by the computer processor based on the context of data, the commonly followed orders, and the user specified order, specified data of the data and a specified order for presenting the specified data to the first user via a personal device associated with the user.

A second aspect of the invention provides a computing system comprising a computer processor coupled to a computer-readable memory unit, the memory unit comprising instructions that when executed by the computer processor implements a method comprising: retrieving, by the computer processor, a first user profile associated with a first user; determining, by the computer processor, a user specified order for presenting data from a services content repository; determining, by the computer processor in response to input from a content administrator, a context of the data; comparing, by the computer processor, the first user profile to profiles of a plurality of users associated with the first user; determining, by the computer processor based on results of the comparing, commonly followed orders of presenting the data to the plurality of users; and determining, by the computer processor based on the context of data, the commonly followed orders, and the user specified order, specified data of the data and a specified order for presenting the specified data to the first user via a personal device associated with the user.

A third aspect of the invention provides a computer program product, comprising a computer readable hardware storage device storing a computer readable program code, the computer readable program code comprising an algorithm that when executed by a computer processor of a computer system implements a method, the method comprising: retrieving, by the computer processor, a first user profile associated with a first user; determining, by the computer processor, a user specified order for presenting data from a services content repository; determining, by the computer processor in response to input from a content administrator, a context of the data; comparing, by the computer processor, the first user profile to profiles of a plurality of users associated with the first user; determining, by the computer processor based on results of the comparing, commonly followed orders of presenting the data to the plurality of users; and determining, by the computer processor based on the context of data, the commonly followed orders, and the user specified order, specified data of the data and a specified order for presenting the specified data to the first user via a personal device associated with the user.

The present invention advantageously provides a simple method and associated system capable of determining content presentation.

DETAILED DESCRIPTION

Figure 1:
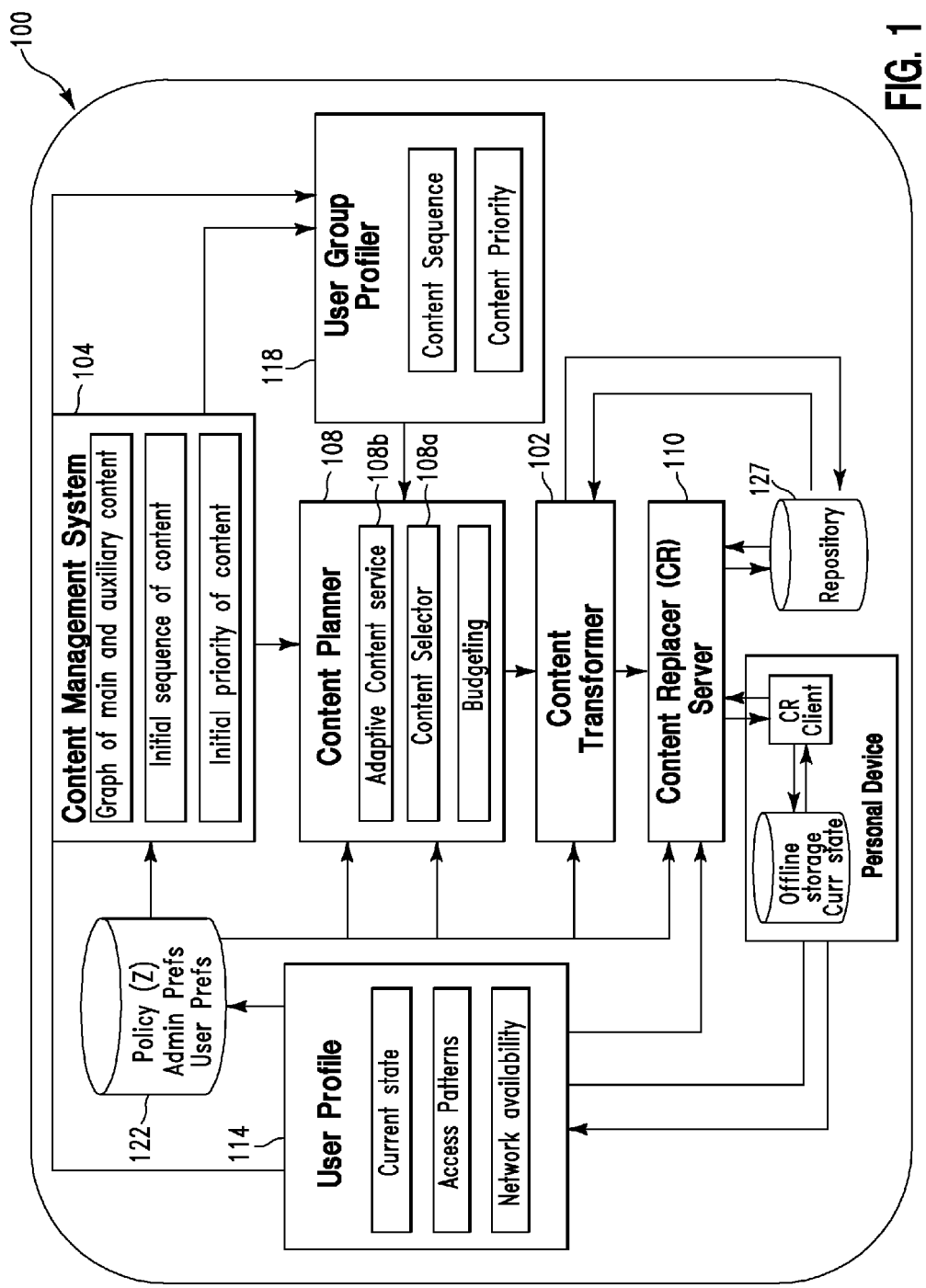
FIG. 1 illustrates a system for personalizing data for a device, in accordance with embodiments of the present invention.

FIG. 1 illustrates a system 100 for personalizing data for a device, in accordance with embodiments of the present invention. System 100 comprises a content services system retrieving factors related to content, a user, and also a history associated with a user population associated with content services. System 100 provides seamless content services under resource and usage constraints without degrading a service experience. System 100 determines factors related to the content such as, inter alia, priority (relative order with respect to content of interest), relevance, resource needs, constraints, etc. Additional factors related to the user comprise, inter alia, consumption pace, progress, content consumed, etc. Additionally, a history of content consumption patterns from peers and a user population is considered based on additional users associated with the content services.

System 100 comprises: a content management system 104, a content planner system 108, a content transformer system 102, a content replacer server 110, a user profile component 114, a user group profile component 118, and a policy engine database 122.

Content management system 104 is configured to host all requested content. Content planner system 108:
1. Identifies a required set of content.
2. Selects content from an identified set of content.
3. Budgets resource needs for selected content.

Content transformer 102 transforms selected content within a personal device of a user. A personal device may include any type of personal device including, inter alia, a cellular telephone, a PDA, a tablet computer, a computer, etc. Content transformer 102 transforms content to be delivered based on a user profile, user content consumption preferences, and policy rules based on identified context. Examples of transformation operations comprise, inter alia,: text summarization operations, video summarization/highlight operations, video transcoding operations, etc.

Content planner system 108 comprises a content selector component 108a for assessing a (order/partial-order) dependency associated with content to be delivered as part of a service. Dependency examples may include, inter alia, a dependency associated with topics to be analyzed for a specific subject, a pace of content consumed by a user, etc. For example (with respect to a learning scenario), understanding or proficiency of earlier topics/content determines progress to future topics. Additionally, content selector 108a determines a relevancy of past, current, and future topics to determine a next set of topics of relevance and their priority. Content selector additionally considers service access patterns of additional users/peers and determines a likely content of interest to the user.

Content replacer server 110 replaces content (within a personal device of a user) with a new set of identified, selected, and transformed content. Content replacer server 110 analyzes limited offline storage on a user personal device and synchronization between a client personal device and a content repository 127 (when storage or connectivity is available). Content replacer server 110 additionally analyzes service access patterns, resource availability patterns, and a stipulated content access schedule. For example, a service access pattern may include a history of a learner studying or content browsing patterns (e.g., time of day, place, etc.). An example resource availability pattern may include available network connectivity (time and session duration). An example stipulated content access schedule may include a time table and curriculum prescribing topics to be covered well in advance of a beginning of a course.

A personalization of content services may be achieved by analyzing a combination of: user profile component 114, user group profile component 118, policy engine database 122, and adaptive content service component 108b. Based on an inherent ordering of content, user preferences, a user content consumption pace, a content consumption schedule, resource constraints and needs, a delivered content may vary with personal devices and users.

System 100 of FIG. 1 performs the following process for determining a list of contents to for synching up between a client personal device and a services content repository:

1. Determining a dependency of delivered content based on the following inputs:
 a. A user specified order of content.
 b. An order based on a context of the content determined by an expert of the content.
 c. An order based on a commonly followed order by the peers or groups of users similar to a user derived from a user profile.
 d. A priority of the newer content based on inputs a-c.
 e. A relevance score of content based on a relevancy specified by inputs b and c.
 f. Resource needs of content based on properties/meta-data of the content.
2. Determining content to be transformed based on identified resource requirements.
3. Determining existing content in a user personal device to be replaced with a new set of identified.

System 100 of FIG. 1 performs a process for determining a list of content comprising priorities, relevance scores, and resource needs and synchronizing the list between a personal device of a user and a content repository based on:
1. Utilization of limited offline storage on a personal device of a user.
2. Performing a two way synchronization process between a personal device of a client and a content repository.
3. Analyzing an order/partial-order dependency among delivered content as part of the service.
4. Determining a future consumption of newer content based on the pace of content consumption.
5. Analyzing service access patterns.
6. Analyzing resource availability patterns.
7. Analyzing a stipulated content/service access schedule. For example, a time table and curriculum that defines topics to be covered before the beginning of a course.
8. Analyzing a relevancy of past, current, and future topics to determine a next set of topics of relevance and associated priority.
9. Analyzing service access patterns of additional users/peers and determining a likely content of interest to a user.

Figure 2:
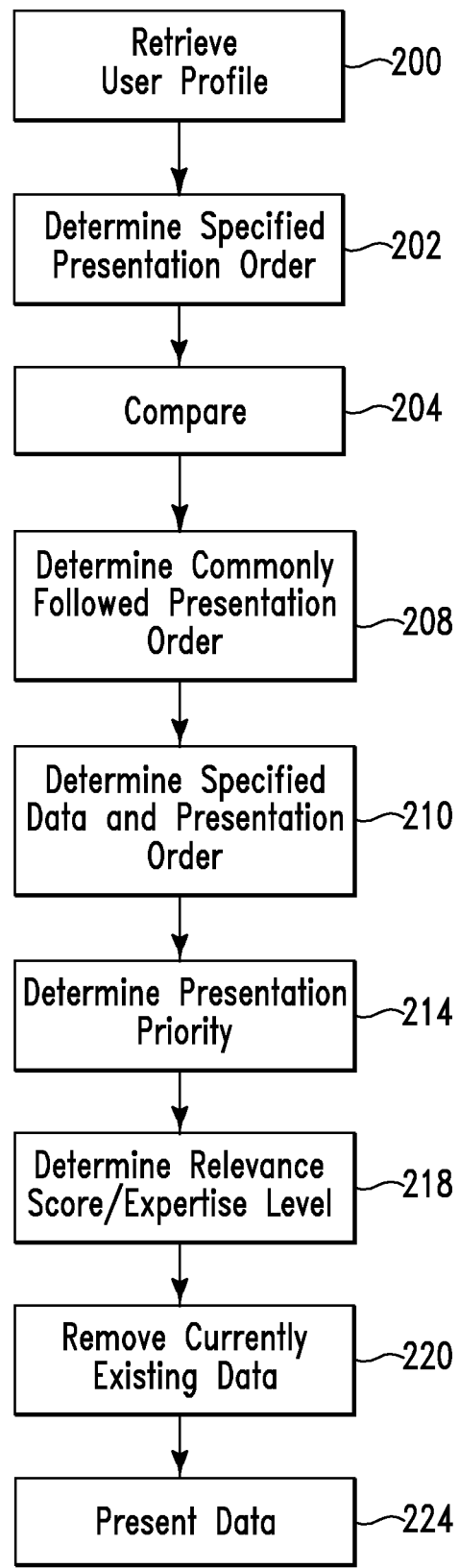
FIG. 2 illustrates an algorithm detailing a process flow enabled by the system of FIG. 1 for personalizing data for a device, in accordance with embodiments of the present invention.

FIG. 2 illustrates an algorithm detailing a process flow enabled by system 100 of FIG. 1 for personalizing data for a device, in accordance with embodiments of the present invention. Each of the steps in the algorithm of FIG. 2 may be enabled and executed in any order by a computer processor executing computer code. In step 200, a first user profile associated with a first user is retrieved. In step 202, a user specified order for presenting data from a services content repository is determined. In step 204, a context of the data is determined in response to input from a content administrator. In step 208, the first user profile is compared to profiles of a plurality of users associated with the first user. In step 210, commonly followed orders of presenting the data to the plurality of users is determined based on results of the comparing of step 208. In step 214, specified data of the data (and/or new data associated with a specified time period) and a specified order for presenting (to the first user via a personal device associated with the user) the specified and/or new data is determined based on the context of data, the commonly followed orders, and the user specified order. In step 218, a relevance score associated with new data is determined based on the commonly followed orders and the user specified order. Additionally, an expertise level of the first user with respect to the specified data is determined and additional data or transformed data is selecting based on the expertise level for presentation to the first user. In step 220, currently existing content is removed from the personal device. In step 224, new data or transformed data is presented to the user.

Figure 3:
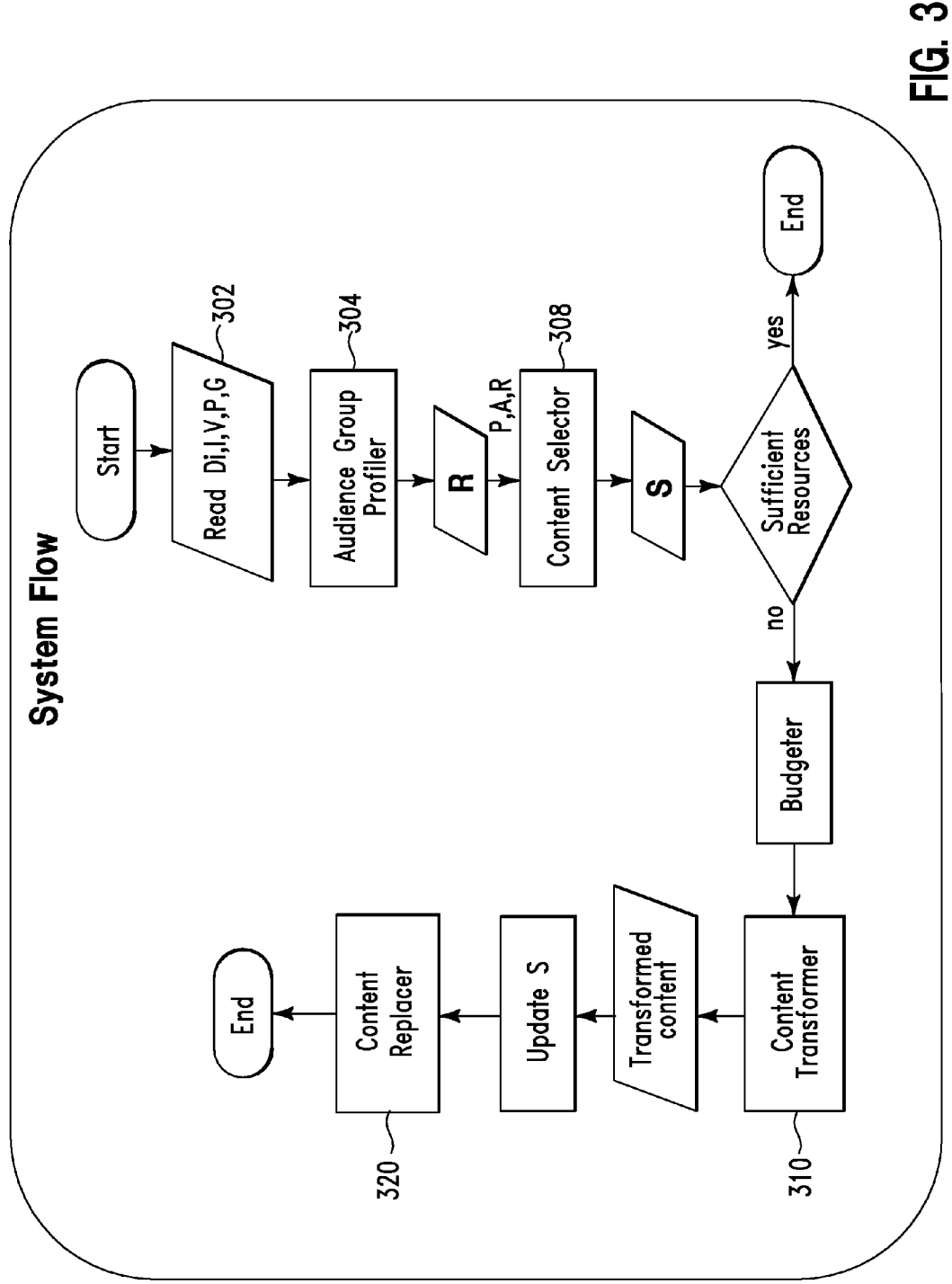
FIG. 3 illustrates a system flow of a personal content service system as illustrated in FIG. 1, in accordance with embodiments of the present invention.

FIG. 3 illustrates a system flow of a personal content service system as illustrated in FIG. 1, in accordance with embodiments of the present invention. In step 302, inputs are read to the system flow. Inputs include:
1. Resource U: <disk space on a device (Di).
2. Network availability NWi>.
3. A current state: {existing items on device I:<I1, I2, ..., In>.
4. A viewing detail V:<V1, V2, ..., Vn>)}.
4. A recommendation R: {<Rc>,<Rp>}.
5. An initial graph of all contents G specifying a dependency and relevancy.
6. An initial priority of content P in graph G.

In step 304, a user profile and a user group profile are gathered based on usage of services by the users. A user profile comprising such preferences, content consumption pace, etc. is captured as part of a user profile component. Additionally, peer content preferences, popular content, most viewed content, and additional recommendations are captured by a user group profiler. In step 308, a content selector receives as inputs:
1. Resource U: <disk space on device (Di), Network availability NWi>.
2. A current state: {existing items on device I:<I1, I2, ..., In>, viewing detail V:<V1, V2, ..., Vn>}.
3. A recommendation R: {<Rc>, <Rp>}.
4. An initial graph of all contents G specifying the dependency and relevancy.
5. An initial priority of content P in Graph G.

Content selector generates as an output a list of contents to be pushed to a device and contents for removal: —S: <Inew, Ie>.

Content selector executes the following steps:
1. Determine items eligible for replacement, Ie.
2. Calculate available disk space D based on Ie and Di.
3. Combine an initial priority P and recommended priority Rp−Pfinal.
4. Use G, I, Rc, V, Pfinal, U to determine new contents Inew (sub-graph of G).

In step 310, a content transformer receives as inputs:
1. Input: S, Policy (Z).

Content transformer generates as an output transformed content into a repository.

Content transformer executes the following steps for each item li in Inew, in an ascending order of Pfinal:
1. Determine if transformed li is available in repository.
2. Determine if li can be transformed.
3. Select a transformation considering policy Z. For example: text summarizer, video transcoder, video summarizers, etc.
4. Add new transformed content to content repository.
5. Update transformed li in S.
6. Determine if S is feasible, then exit, else continue.

In step 320, a content replacer receives as inputs: S. Content replacer generates as an output, an updated offline storage with new content. Content replacer executes the following steps for each item in S.
1. If item equals Ie, remove Ie on personal device.
2. If item equals Inew, transfer to personal device.

Figure 4:
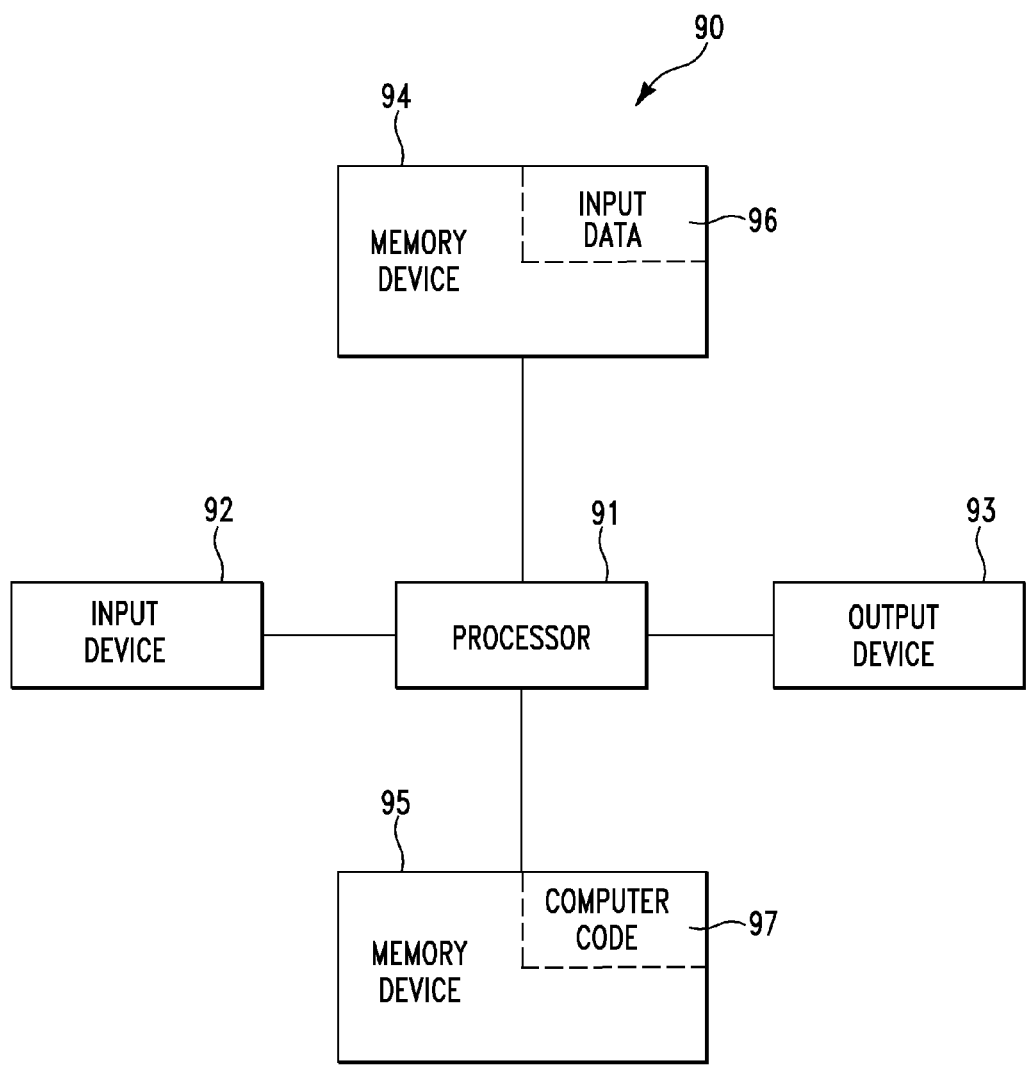
FIG. 4 illustrates a computer apparatus used by the system of FIG. 1 for personalizing data for a device, in accordance with embodiments of the present invention.

FIG. 4 illustrates a computer apparatus 90 (e.g., implementing any components of FIG. 1) used by system 100 of FIG. 1 for personalizing data for a device, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for personalizing data for a device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithm of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to personalize data for a device. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for personalizing data for a device. In another embodiment, the invention provides a business method that performs the process steps of the invention on a subscription, advertising, and/or fee basis. That is, a service supplier, such as a Solution Integrator, could offer to personalize data for a device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
   retrieving, by a computer processor of a computing system, a first user profile associated with a first user;
   determining, by said computer processor, a user specified order for presenting data from a services content repository;
   determining, by said computer processor in response to input from a content administrator, a context of said data;
   comparing, by said computer processor, said first user profile to profiles of a plurality of users associated with said first user;
   determining, by said computer processor based on results of said comparing, commonly followed orders of presenting said data to said plurality of users;
   determining, by said computer processor, a relevancy of past, current, and future topics of said data;
   determining, by said computer processor, access patterns of additional users with respect to said data;
   determining, by said computer processor based on said relevancy and said access patterns, a next set of relevant topics of said data and associated priorities;
   determining, by said computer processor, a resource availability pattern associated with a network connectivity session duration of a course curriculum associated with a course;
   determining, by said computer processor based on said context of data, said commonly followed orders, said resource availability pattern, said next set of relevant topics of said data and associated priorities, and said user specified order, specified data of said data and a specified order for presenting said specified data to said first user via a personal device associated with said user;
   determining, by said computer processor based on properties of metadata of said specified data, resource needs of said specified data;

transforming, by said computer processor, said specified data to accommodate resource budget constraints of said resource needs, wherein said transforming said specified data comprises summarizing text of said specified data, summarizing video content of said specified data, or transcoding video content of said specified data; and synchronizing, by said computer processor, said specified data between said personal device and a content repository based on offline based storage of said personal device.

2. The method of claim 1, further comprising:

determining, by said computer processor based on said context of data, said commonly followed orders, and said user specified order, and said specified order, a presentation priority for presenting new data of said specified data to said first user via said personal device associated with said user, wherein said new data is associated with a specified time period.

3. The method of claim 2, further comprising:

determining, by said computer processor based on said commonly followed orders and said user specified order, a relevance score associated with said new data.

4. The method of claim 1, further comprising:

determining, by said computer processor, currently existing content of said personal device;

removing, by said computer processor, said currently existing content from said personal device; and presenting, by said computer processor to said user via said personal device in response to said removing, said specified data.

5. The method of claim 1, further comprising:

determining, by said computer processor, an expertise level of said first user with respect to said specified data;

selecting, by said computer processor based on said expertise level, additional data or transformed data of said data for presentation to said first user;

removing, by said computer processor, currently existing content from said personal device; and presenting, by said computer processor to said user via said personal device in response to said removing, said additional data or transformed data.

6. The method of claim 1, further comprising:

determining, by said computer processor, an expertise level of said first user with respect to previously consumed data;

selecting, by said computer processor based on said expertise level, additional data or transformed data of said data for presentation to said first user;

removing, by said computer processor, currently existing content from said personal device; and presenting, by said computer processor to said user via said personal device in response to said removing, said additional data or transformed data.

7. The method of claim 1, further comprising:

providing at least one support service for at least one of creating, integrating, hosting, maintaining, and deploying computer-readable code in the computing system, said code being executed by the computer processor to implement: said retrieving, said determining said user specified order, said determining said context, said comparing, said determining said commonly followed orders, and said determining said specified data.

8. A computing system comprising a computer processor coupled to a computer-readable memory unit, said memory unit comprising instructions that when executed by the computer processor implements a method comprising:

retrieving, by said computer processor, a first user profile associated with a first user;

determining, by said computer processor, a user specified order for presenting data from a services content repository;

determining, by said computer processor in response to input from a content administrator, a context of said data;

comparing, by said computer processor, said first user profile to profiles of a plurality of users associated with said first user;

determining, by said computer processor based on results of said comparing, commonly followed orders of presenting said data to said plurality of users;

determining, by said computer processor, a relevancy of past, current, and future topics of said data;

determining, by said computer processor, access patterns of additional users with respect to said data;

determining, by said computer processor based on said relevancy and said access patterns, a next set of relevant topics of said data and associated priorities;

determining, by said computer processor, a resource availability pattern associated with a network connectivity session duration of a course curriculum associated with a course;

determining, by said computer processor based on said context of data, said commonly followed orders, said resource availability pattern, said next set of relevant topics of said data and associated priorities, and said user specified order, specified data of said data and a specified order for presenting said specified data to said first user via a personal device associated with said user;

determining, by said computer processor based on properties of metadata of said specified data, resource needs of said specified data;

transforming, by said computer processor, said specified data to accommodate resource budget constraints of said resource needs, wherein said transforming said specified data comprises summarizing text of said specified data, summarizing video content of said specified data, or transcoding video content of said specified data; and synchronizing, by said computer processor, said specified data between said personal device and a content repository based on offline based storage of said personal device.

9. The computing system of claim 8, wherein said method further comprises:

determining, by said computer processor based on said context of data, said commonly followed orders, and said user specified order, and said specified order, a presentation priority for presenting new data of said specified data to said first user via said personal device associated with said user, wherein said new data is associated with a specified time period.

10. The computing system of claim 9, wherein said method further comprises:

determining, by said computer processor based on said commonly followed orders and said user specified order, a relevance score associated with said new data.

11. The computing system of claim 8, wherein said method further comprises:

determining, by said computer processor, currently existing content of said personal device;

removing, by said computer processor, said currently existing content from said personal device; and presenting, by said computer processor to said user via said personal device in response to said removing, said specified data.

12. The computing system of claim 8, wherein said method further comprises:

determining, by said computer processor, an expertise level of said first user with respect to said specified data;

selecting, by said computer processor based on said expertise level, additional data or transformed data of said data for presentation to said first user;

removing, by said computer processor, currently existing content from said personal device; and presenting, by said computer processor to said user via said personal device in response to said removing, said additional data or transformed data.

13. The computing system of claim 8, wherein said method further comprises:

determining, by said computer processor, an expertise level of said first user with respect to previously consumed data;

selecting, by said computer processor based on said expertise level, additional data or transformed data of said data for presentation to said first user;

removing, by said computer processor, currently existing content from said personal device; and presenting, by said computer processor to said user via said personal device in response to said removing, said additional data or transformed data.

14. A computer program product, comprising a non-transitory computer readable hardware storage device storing a computer readable program code, said computer readable program code comprising an algorithm that when executed by a computer processor of a computer system implements a method, said method comprising:

retrieving, by said computer processor, a first user profile associated with a first user;

determining, by said computer processor, a user specified order for presenting data from a services content repository;

determining, by said computer processor in response to input from a content administrator, a context of said data;

comparing, by said computer processor, said first user profile to profiles of a plurality of users associated with said first user;

determining, by said computer processor based on results of said comparing, commonly followed orders of presenting said data to said plurality of users;

determining, by said computer processor, a relevancy of past, current, and future topics of said data;

determining, by said computer processor, access patterns of additional users with respect to said data;

determining, by said computer processor based on said relevancy and said access patterns, a next set of relevant topics of said data and associated priorities;

determining, by said computer processor, a resource availability pattern associated with a network connectivity session duration of a course curriculum associated with a course;

determining, by said computer processor based on said context of data, said commonly followed orders, said resource availability pattern, said next set of relevant topics of said data and associated priorities, and said user specified order, specified data of said data and a specified order for presenting said specified data to said first user via a personal device associated with said user;

determining, by said computer processor based on properties of metadata of said specified data, resource needs of said specified data;

transforming, by said computer processor, said specified data to accommodate resource budget constraints of said resource needs, wherein said transforming said specified data comprises summarizing text of said specified data, summarizing video content of said specified data, or transcoding video content of said specified data; and synchronizing, by said computer processor, said specified data between said personal device and a content repository based on offline based storage of said personal device.

\* \* \* \* \*